(12) United States Patent
Marleau-Finley

(10) Patent No.: US 12,162,034 B2
(45) Date of Patent: Dec. 10, 2024

(54) INTERNAL SURFACE TREATMENT DEVICE FOR HOLLOW ENGINE SHAFT AND THE LIKE

(71) Applicant: PRATT & WHITNEY CANADA CORP., Longueuil (CA)

(72) Inventor: Julien Marleau-Finley, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/153,401

(22) Filed: Jan. 12, 2023

(65) Prior Publication Data
US 2024/0238831 A1    Jul. 18, 2024

(51) Int. Cl.
*B05C 7/06* (2006.01)
*B05D 7/22* (2006.01)
*F02C 7/30* (2006.01)

(52) U.S. Cl.
CPC .................. *B05C 7/06* (2013.01); *B05D 7/22* (2013.01); *F02C 7/30* (2013.01); *F05D 2240/61* (2013.01)

(58) Field of Classification Search
None
See application file for complete search history.

(56) References Cited

U.S. PATENT DOCUMENTS

| | | | |
|---|---|---|---|
| 947,439 A * | 1/1910 | Greenfield | B05D 7/22 427/230 |
| 1,455,065 A * | 5/1923 | Bellows | B05C 7/08 118/DIG. 10 |
| 1,671,374 A * | 5/1928 | Moore | B05C 7/08 118/DIG. 10 |
| 1,746,071 A | 6/1930 | Cotton | |
| 1,787,126 A * | 12/1930 | Steinnes | B05C 7/08 118/DIG. 10 |
| 1,796,338 A * | 3/1931 | Mocre | B05C 7/08 427/230 |
| 2,112,212 A * | 3/1938 | Purcell | B05C 7/08 118/DIG. 10 |

(Continued)

FOREIGN PATENT DOCUMENTS

JP    2001239200 A    9/2001

OTHER PUBLICATIONS

European Search Report issued in counterpart EP application No. 24151705.1 on Jun. 27, 2024.

*Primary Examiner* — Jethro M. Pence
(74) *Attorney, Agent, or Firm* — NORTON ROSE FULBRIGHT CANADA LLP

(57) ABSTRACT

A surface treatment device for applying a surface treatment to an inner surface of a hollow engine shaft extending longitudinally along a shaft axis and having an axial shaft length to be treated. The device includes a supply of a surface treatment agent and an elongated rod extending from a proximal end to a distal end with an applicator disposed at the distal end. The elongated rod is insertable inside the hollow engine shaft. An applicator is disposed at the distal end of the elongated rod and wetted with the surface treatment agent. The applicator is engageable with the inner surface of the hollow engine shaft for applying the surface treatment agent to the inner surface of the hollow engine shaft. A pair of markers are disposed on the elongated rod and axially spaced apart from one another at a first axial distance corresponding to the axial shaft length.

9 Claims, 4 Drawing Sheets

(56) References Cited

U.S. PATENT DOCUMENTS

| | | | | |
|---|---|---|---|---|
| 2,158,579 | A * | 5/1939 | Hodgkins | B05C 7/08 |
| | | | | 118/259 |
| 2,445,645 | A * | 7/1948 | Stephens | B05C 7/08 |
| | | | | 118/DIG. 10 |
| 2,480,358 | A * | 8/1949 | Curtis | B05C 7/08 |
| | | | | 118/DIG. 10 |
| 3,007,810 | A | 11/1961 | Hobrock | |
| 3,029,027 | A * | 4/1962 | Gray | B05D 7/22 |
| | | | | 239/222 |
| 3,111,431 | A | 11/1963 | Weaver | |
| 3,112,227 | A * | 11/1963 | Curtis | B05C 7/08 |
| | | | | 15/104.095 |
| 3,117,026 | A * | 1/1964 | Spier | B05C 7/06 |
| | | | | 15/104.095 |
| 3,118,791 | A * | 1/1964 | McLean | B05C 7/08 |
| | | | | 118/503 |
| 3,211,573 | A * | 10/1965 | Hight | B05D 7/222 |
| | | | | 118/DIG. 13 |
| 3,280,845 | A * | 10/1966 | Eskijian | B05C 7/08 |
| | | | | 29/460 |
| 3,885,521 | A | 5/1975 | von Arx | |
| 3,946,125 | A * | 3/1976 | Scheiber | B05D 7/22 |
| | | | | 118/317 |
| 4,031,605 | A * | 6/1977 | Couch | B05D 7/22 |
| | | | | 264/254 |
| 4,084,781 | A * | 4/1978 | Couch | B05D 7/22 |
| | | | | 249/83 |
| 4,158,071 | A * | 6/1979 | Jordan | B05D 7/22 |
| | | | | 427/232 |
| 4,184,830 | A * | 1/1980 | Perkins | B28B 19/0023 |
| | | | | 425/469 |
| 4,716,053 | A | 12/1987 | Eskijian | |
| 4,774,905 | A * | 10/1988 | Nobis | F16L 55/1645 |
| | | | | 427/236 |
| 5,066,518 | A * | 11/1991 | Klingen | B05D 7/22 |
| | | | | 427/236 |
| 5,141,774 | A * | 8/1992 | Prittinen | B05B 3/1064 |
| | | | | 427/236 |
| 6,228,169 | B1 * | 5/2001 | Wallace | B05D 7/14 |
| | | | | 411/908 |
| 6,309,693 | B1 * | 10/2001 | Wallace | B05B 13/0636 |
| | | | | 427/195 |
| 6,474,919 | B2 * | 11/2002 | Wallace | B05D 7/14 |
| | | | | 411/301 |
| 7,556,689 | B2 * | 7/2009 | Lee | F28D 15/0275 |
| | | | | 222/401 |
| 7,717,056 | B2 * | 5/2010 | Horn | F16L 55/1645 |
| | | | | 118/DIG. 13 |
| 8,359,996 | B2 * | 1/2013 | Horn | B05D 7/222 |
| | | | | 118/DIG. 13 |
| 9,108,205 | B2 * | 8/2015 | Bottger | B05B 7/0458 |
| 9,586,218 | B2 * | 3/2017 | Bottger | B05B 13/06 |
| 9,616,449 | B2 * | 4/2017 | Harmat | B05D 7/22 |
| 10,118,187 | B1 * | 11/2018 | Monaghan | B05B 13/0636 |
| 10,399,118 | B2 * | 9/2019 | Harmat | B05B 13/0645 |
| 10,520,265 | B2 * | 12/2019 | Kwark | B05D 7/222 |
| 10,677,031 | B2 * | 6/2020 | Xiao | F04B 23/04 |
| 10,828,661 | B2 | 11/2020 | Lokkinen | |
| 2006/0117799 | A1 * | 6/2006 | Miyahara | C03C 17/30 |
| | | | | 360/98.08 |
| 2019/0054496 | A1 * | 2/2019 | Lokkinen | A46D 1/0238 |

* cited by examiner

INTERNAL SURFACE TREATMENT DEVICE FOR HOLLOW ENGINE SHAFT AND THE LIKE

TECHNICAL FIELD

The disclosure relates to a device and a method for applying a surface treatment, such as paint, to the inner surface of hollow engine shafts and the like.

BACKGROUND

Hollow shafts used for aircraft engines and the like may be coated. For instance, these shafts may be painted to prevent corrosion. Due to their size, access to the inner surface of these shafts may be limited, and known techniques for protecting the outer shaft surfaces, for instance via paint guns, may not be suitable

SUMMARY

In one aspect, there is provided a surface treatment device for applying a surface treatment to an inner surface of a hollow engine shaft, the hollow engine shaft extending longitudinally along a shaft axis and having an axial shaft length to be treated, the surface treatment device comprising a supply of a surface treatment agent, an elongated rod extending from a proximal end to a distal end with an applicator disposed at the distal end, the elongated rod insertable inside the hollow engine shaft, an applicator disposed at the distal end of the elongated rod and wetted with the surface treatment agent, the applicator engageable with the inner surface of the hollow engine shaft for applying the surface treatment agent to the inner surface of the hollow engine shaft, and a pair of markers disposed on the elongated rod and axially spaced apart from one another at a first axial distance corresponding to the axial shaft length.

In another aspect, there is provided a coating rod for applying a coating liquid to an inner surface of a section of a hollow engine shaft, the hollow engine shaft extending longitudinally along a shaft axis from a first shaft end to a second shaft end, the section of the hollow engine shaft extending from a first end of the section to a second end of the section, the coating rod comprising an elongated body extending longitudinally from a first rod end to a second rod end, the elongated body sized and configured for axial insertion inside the hollow engine shaft, a coating applicator disposed at the second rod end of the elongated body, a first marker disposed on the elongated body and configured for axial alignment with the first shaft end as the coating applicator is axially aligned with the first end of the section, and a second marker disposed on the elongated body, axially spaced apart from the first marker, and configured for axial alignment with the first shaft end as the coating applicator is axially aligned with the second end of the section.

In a further aspect, there is provided a method for treating an inner surface of a hollow engine shaft, comprising engaging an elongated rod inside the hollow engine shaft, the elongated rod having a distal end carrying an applicator wetted with a surface treatment agent, and spreading the surface treatment agent, with the applicator, along the inner surface of a section of the hollow engine shaft between a first rod position whereby a first marker disposed on the elongated rod is axially aligned with a first end of the hollow engine shaft and a second rod position whereby a second marker disposed on the elongated rod is axially aligned with the first end of the hollow engine shaft, the first marker and the second marker being axially spaced apart from one another by an axial length corresponding to an axial length of the section of the hollow engine shaft.

BRIEF DESCRIPTION OF THE DRAWINGS

Reference is now made to the accompanying figures in which.

DETAILED DESCRIPTION

Figure 1:
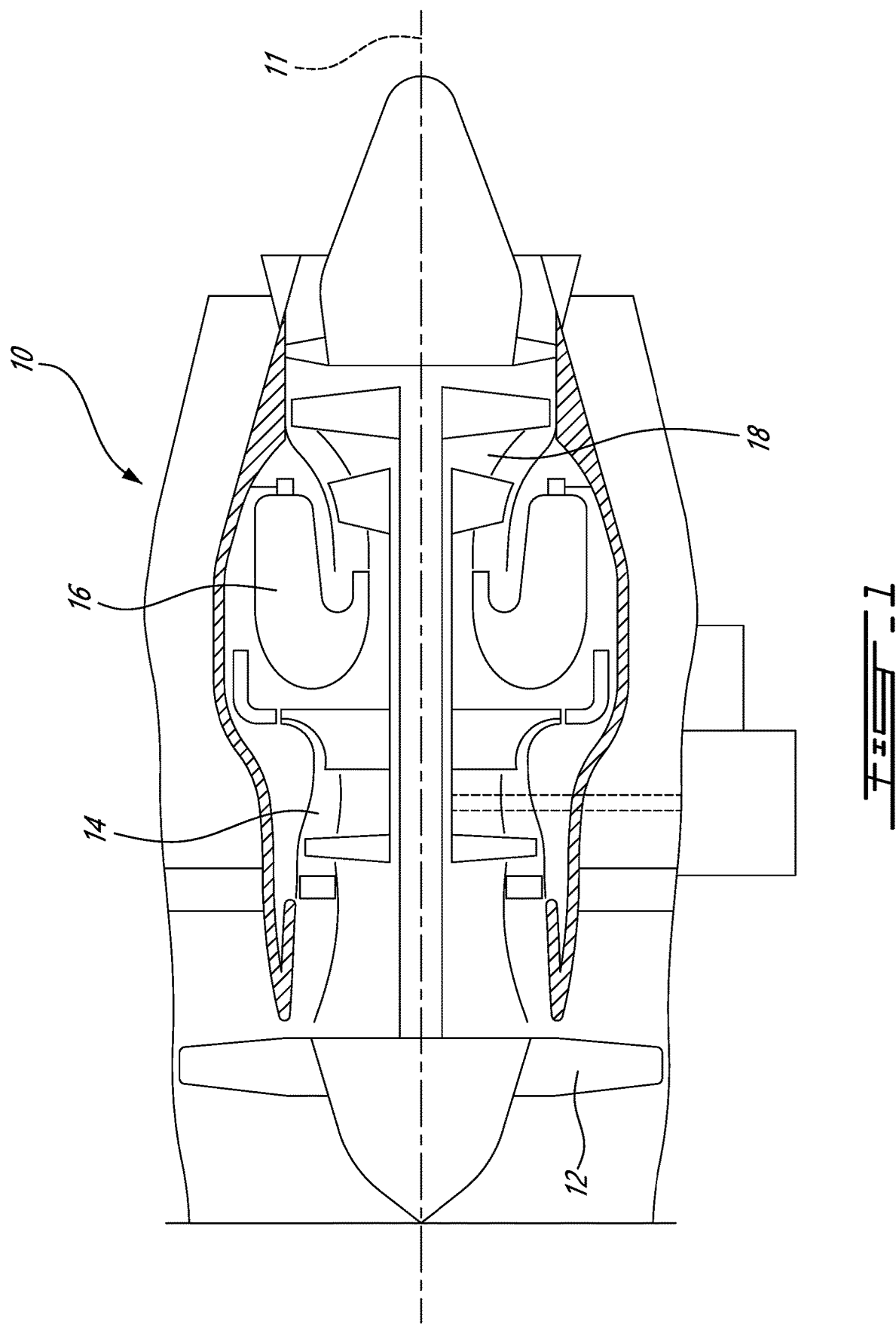
FIG. 1 is a schematic cross sectional view of a gas turbine engine.

FIG. 1 illustrates a gas turbine engine 10 of a type preferably provided for use in subsonic flight, generally comprising in serial flow communication, along central longitudinal axis 11, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. While the depicted engine 10 is a turbofan engine, the present disclosure is applicable to other types of engines, such as turbojet, turboprop, and turboshaft engines, as well as hybrid-electric engines.

Figure 2:
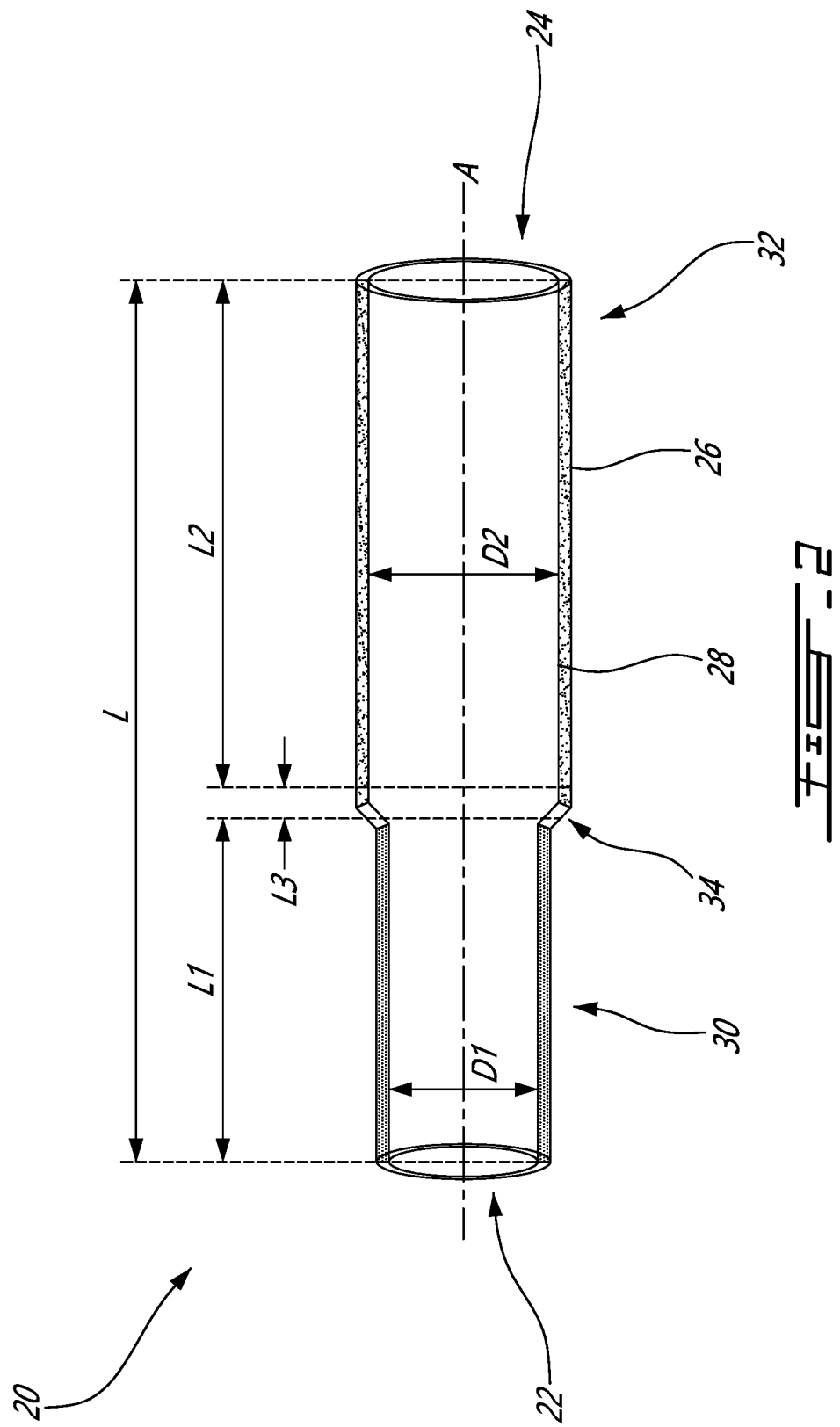
FIG. 2 is a schematic cross sectional view of an exemplary shaft for the engine of FIG. 1.

Referring to FIG. 2, an exemplary hollow shaft 20 used in the engine 10 is shown. Shaft 20 may be, for instance, a main shaft for the engine 10, a power turbine shaft for the turbine section 18, or a low pressure shaft drivingly coupling a low pressure compressor of the compressor section 14 to a low pressure turbine of the turbine section 18. Other hollow shafts of the engine 10 may be contemplated. The shaft 20 may be made from steel or other like materials. Other materials may be contemplated as well. The shaft 20 extends along a shaft longitudinal axis A from a first end 22 to a second end 24. The shaft 20 has a hollow cylindrical body with an outer surface 26 and an inner surface 28 radially disposed within the outer surface 26.

In the shown case, the shaft 20 is made up of two sections having inner surfaces 28 with different inner diameters: a first section 30 of axial length L1 having a first inner diameter D1, and a second section 32 of axial length L2 having a second inner diameter D2 for its inner surface 28. A transition portion 34 of axial length L3, for instance a tapered or frustoconical portion, joins the first section 30 to the second section 32. An overall axial length L of the shaft 20 may include the first section axial length L1, the second section axial length L2, and the transition portion axial length L3. In the shown case, the second inner diameter D2 is greater in magnitude than the first inner diameter D1, although the opposite arrangement may be contemplated. Similarly, in the shown case, the second section axial length L2 is greater in magnitude than the first section axial length L1, although the opposite may be contemplated.

Various combinations of diameters and lengths for each section 30, 32 may be contemplated. While the shown shaft 20 includes two main sections 30, 32, the present disclosure is applicable to shafts 20 with other numbers of sections having different inner diameters, for instance three or more sections of different axial lengths and inner diameters. Similarly, the present disclosure is applicable to a shaft 20 having a constant inner diameter along its axial length (i.e., a single section shaft). In some cases, the shaft 20 may have an axial length L ranging from 20 to 80 inches long, with an inner diameter ranging from 0.360 to 1.400 inches. Other shaft lengths and diameters may be contemplated.

Figure 3:
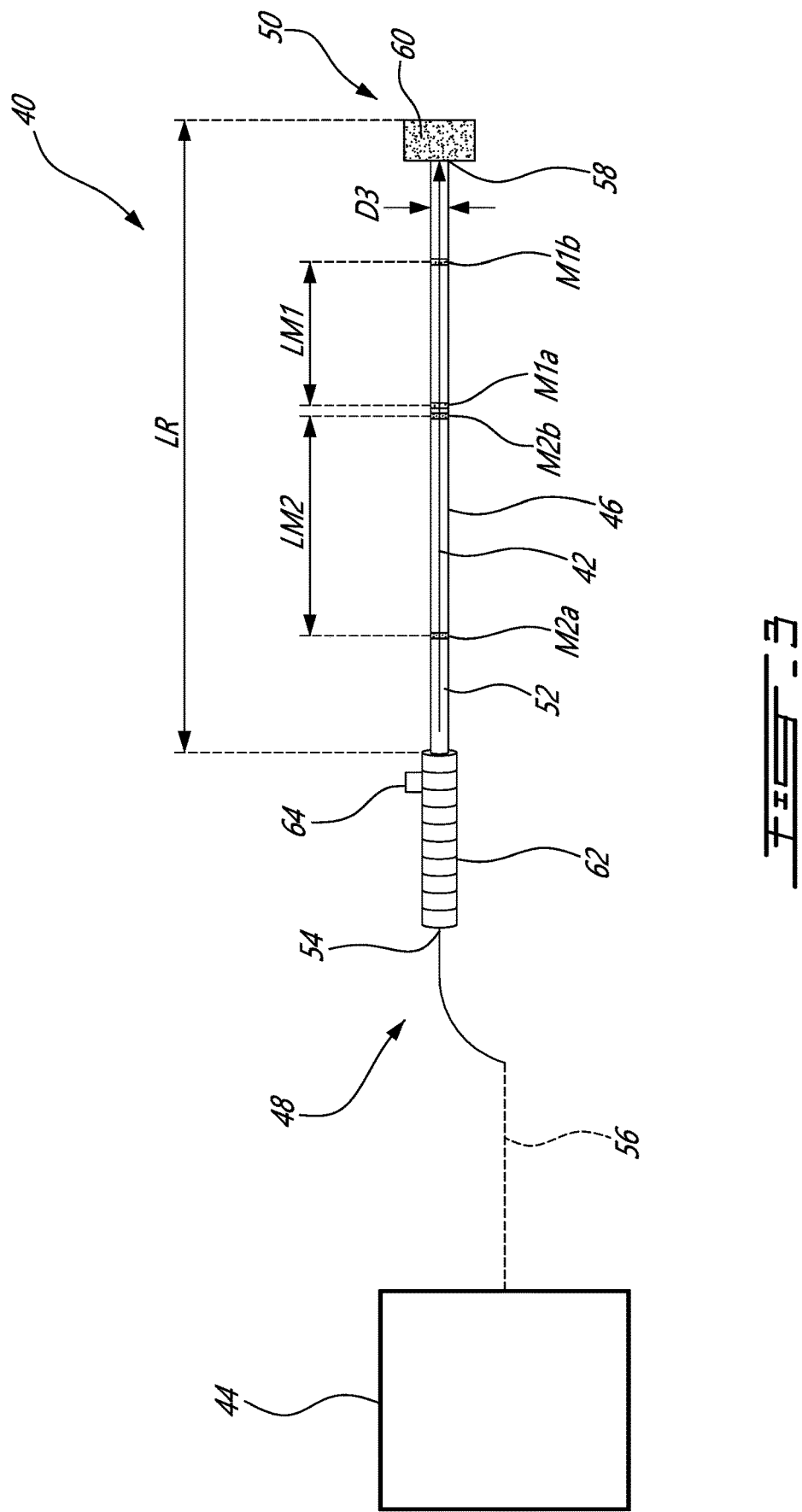
FIG. 3 is a schematic cross sectional view of a surface treatment device according to an embodiment of the present disclosure.

Referring additionally to FIG. 3, a surface treatment device 40 is shown for applying a surface treatment agent 42 (e.g., paint/liquid coating) stored in a surface treatment supply 44 to an inner surface 28 of a shaft 20, for instance the shaft 20 of FIG. 2, according to one or more embodiments of the present disclosure. Still according to one or more embodiments, the surface treatment agent 42 may be paint, with the surface treatment device 40 operable to apply a uniform layer or coating of paint to the inner surface 28 of the shaft 20 to protect the inner surface 28 of the shaft from corrosion. Other surface treatment agents 42 may be contemplated, for instance protective liquid coatings, such as a rust-proofing coating.

The surface treatment device 40 depicted in FIG. 3 includes an elongated rod 46, also referred to as a coating rod, having an elongated body of diameter D3 extending longitudinally from a proximal end 48 (also referred to as a first end) to a distal end 50 (also referred to as a second end), with an inner passage 52 extending longitudinally centrally through the elongated rod 46 from the proximal end 48 to the distal end 50. At the proximal end 48, there is an inlet 54 (also referred to as a coating inlet) to the inner passage 52 fluidly coupled to the surface treatment supply 44, illustratively via a flexible conduit or hose 56. At the distal end 50, the inner passage 52 terminates at an outlet 58. The surface treatment agent 42 (e.g., the paint or liquid coating substance) is shown as flowing through the inner passage 52, defining a general surface treatment flow direction from the proximal end 48 to the distal end 50.

An applicator 60 is disposed at the distal end 50 adjacent the outlet, illustratively downstream of the outlet. As such, the surface treatment device 40 is operable for treating the inner surface 28 of the exemplified engine shaft 20 by supplying the surface treatment agent 42, from the supply 44, through the inner passage 52 of the elongated rod 46 to the applicator 60 at the distal end 50 thereof to apply the surface treatment agent 42 to the inner surface 28. The rod diameter D3 may be sized to be smaller in magnitude than the smallest of the hollow shaft 20 interior diameters, illustratively D1 in the shaft 20 shown in FIG. 2, so that the elongated rod 46 may be easily inserted into the hollow shaft 20 along shaft axis A.

The elongated rod 46 may be made from, for instance, steel, aluminum, or a hard plastic. Other materials may be contemplated as well. In the shown case, the device 40 includes a handle 62 at the proximal end 48 with one or more control buttons 64 (e.g., push-button or trigger) for controlling the delivery of the surface treatment agent 42 from the surface treatment supply 44 to the applicator 60. Various delivery means from the supply 44 to the elongated rod 46 may be contemplated, for instance manual or automatic pumps.

While the device 40 shown in FIG. 3 is operable for treating the inner surface 28 of the exemplary engine 10 by supplying the surface treatment agent 42 through the inner passage 52 of the elongated rod 46, other delivery means may be contemplated by which the applicator 60 is engageable with the supply 44 for wetting the applicator 60 with the surface treatment agent 42. For instance, a user may wet or saturate the applicator 60 with the surface treatment agent 42 by dipping or otherwise inserting the applicator 60 in the surface treatment supply 44 (e.g., a vat or bucket filled with surface treatment supply 44) before inserting the applicator 60 axially into the hollow shaft 20. In such cases, the elongated rod 46 may not include an inner passage 52, inlet 54 or outlet 58, with no conduit 56 fluidly coupling the surface treatment supply 44 to the elongated rod 46. Other means for supplying the surface treatment agent 42 to the applicator 60 may be contemplated.

In the embodiment shown in FIG. 3, the coating device 40 includes a single applicator 60 mounted to the distal end 50 of the elongated rod 46, although the number of applicators 60 may vary. For instance, two or more applicators 60 may be disposed towards the distal end 50 of the elongated rod 46, each applicator 60 axially separated along the elongated rod 46 by an axial gap. In the shown case, the outlet 58 is directly fluidly coupled to the applicator 60 (i.e., the applicator 60 is operable to directly receive the surface treatment supply 44 from the outlet 58). Other outlets may be contemplated, for instance one or more nozzles disposed towards the distal end 50 and aimed either at the applicator(s) 60 or radially outwardly towards the inner surface 28 of the shaft 20. Other outlet types (or no outlet, as discussed above) may be contemplated.

In the embodiment shown in FIG. 3, the applicator 60 is a sponge, i.e., an applicator 60 able to expand and contract based on its surroundings. Other applicators 60 may be contemplated, for instance a brush. The porosity of the sponge may vary, for instance based on a desired final paint texture on the inner surface 28. The sponge may be sized to span a greater diameter than the greatest inner diameter of the hollow shaft 20 (illustratively D2 of the hollow shaft 20 of FIG. 2) and be compressible to easily slide within the section of the hollow shaft 20 having the smallest inner diameter (illustratively D1 of the hollow shaft 20 of FIG. 2). As such, the wet or saturated sponge may apply the surface treatment agent 42 in all directions to the inner surface 28, providing a consistent application of the surface treatment agent 42. Such application may be accomplished, for instance, via a reciprocating motion of the elongated rod 46 along the shaft axis A, with additional surface treatment agent 42 being provided to the application 60 (e.g., to the compressed sponge) as needed.

In the embodiment shown in FIG. 3, the flowable surface treatment agent 42 may be provided to the applicator 60 as needed, for instance via button(s) 64, so that the applicator 60 is constantly saturated at a desired level to coat the inner surface 28 at a consistent thickness along its length L. In other cases, the nozzle(s) 58 may be aimed radially outwardly, i.e. towards the inner surface 28 of the shaft 20 directly. In such cases, the applicator 60 may be used to spread the surface treatment agent 42 that is sprayed onto the inner surface 28 by the nozzle(s) 58.

Still referring to FIG. 3, the elongated rod 46 includes a plurality of markers M, also referred to as identifiers, corresponding to the axial lengths L1, L2 of the first and second sections 30, 32 of the hollow engine shaft 20. In particular, markers M1*a* and M1*b* are axially disposed along the elongated rod 46 and axially spaced apart from one another by a distance LM1 that corresponds with the axial length L1 of the first section 30, while markers M2*a* and M2*b* are axially disposed along the elongated rod 46 and axially spaced apart from one another by a distance LM2 that corresponds with the axial length L2 of the second section 32. As such, the markers M may be used to identify an axial stroke length that corresponds with an axial length of a respective shaft section. Stated differently, a user may use the markers M to identify the axial start and end points of a given shaft section, as well as where one shaft section ends and another begins along the axis A, so that each stroke of the elongated rod 46 has an axial length corresponding to the axial length of the given shaft section. In the shown case, the markers M2b and M1a are disposed axially adjacent one another. This axial location along the elongated rod 46 may correspond to the applicator 60 being at the transition portion 34 of the hollow shaft 20, i.e., between first and second sections 30, 32 (see FIGS. 2 and 4).

In the embodiment shown in FIG. 3, the markers M are visual markers. For instance, markers M may be painted or otherwise applied to the elongated rod 46. Other marker types may be contemplated, for instance engravings into the elongated rod 46, shoulders extending radially from the surface of the elongated rod 46, or magnetic or radio-frequency identification (RFID) markers operable to engage with corresponding magnets or RFID readers inside the shaft 20 for positional identification. In the case of shoulders, a user may distinguish between shaft sections based on the shoulders abutting the inner surface 28 of the shaft 20. Various means for distinguishing between sets of markers M, i.e., markers M1a/M1b and M2a/M2b may be contemplated. For instance, in the case of visual markers, different colours, shapes, or axial thicknesses may be used to distinguish between each set. In the case of shoulders extending radially from the surface of the elongated rod 46, the degree to which each set of shoulders extends radially may vary, and may depend on the inner diameter of each shaft section (e.g., D1 and D2) for abutment between shoulder and inner surface 28 at the appropriate axial location.

Figure 4:
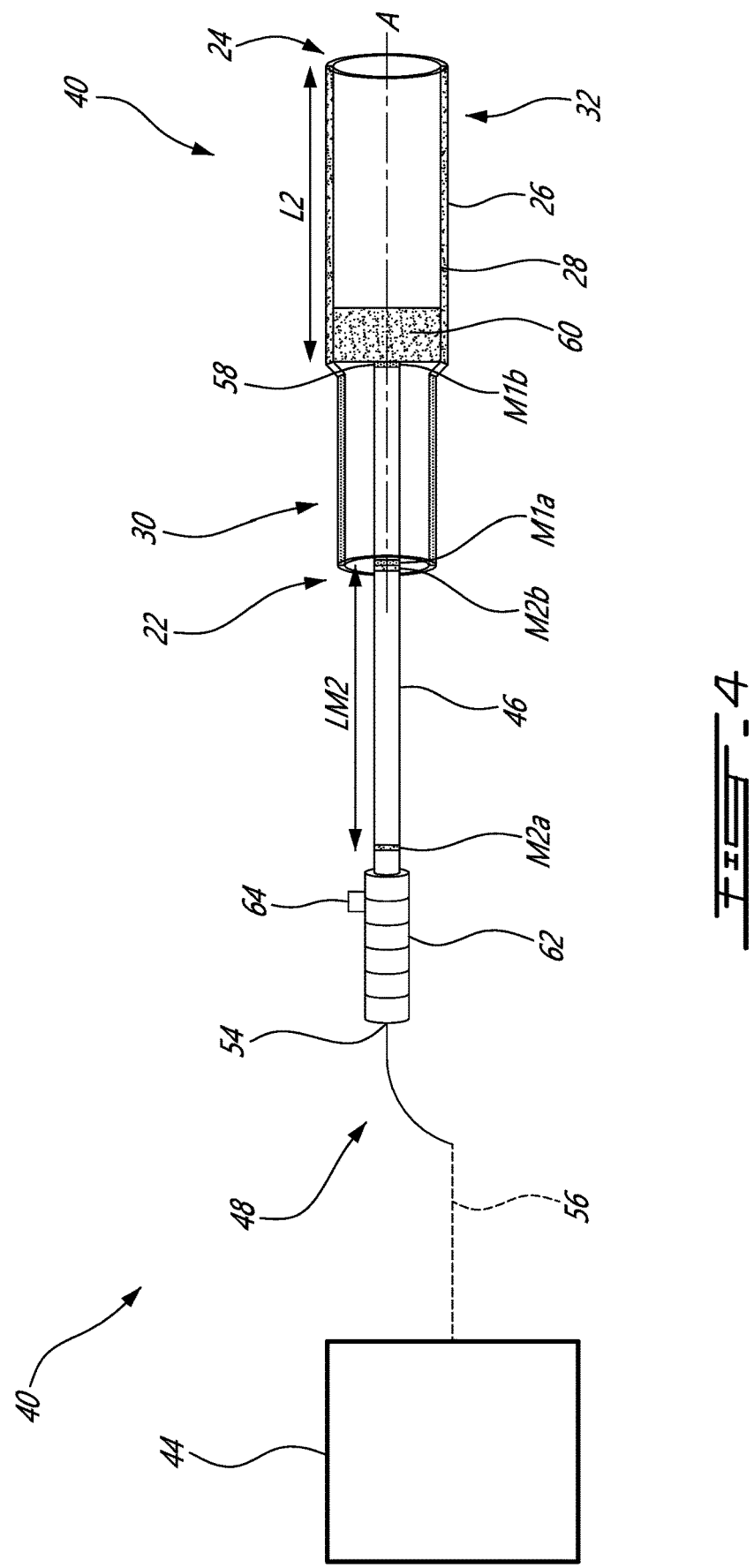
FIG. 4 is a schematic cross sectional view of an exemplary surface treatment process of the shaft of FIG. 2 using the surface treatment device of FIG. 3.

Referring to FIG. 4, an exemplary surface treatment procedure for hollow engine shaft 20 is shown. In particular, a procedure for treating the inner surface 28 of the second section 32 is shown, although it is understood that a similar procedure may be used for first section 30 or any other sections. The elongate rod 46 is axially inserted in the hollow shaft 20 until the marker M2b is axially aligned with the first end 22 of the shaft 20. This location corresponds with the applicator 60 being axially aligned with a beginning, or upstream-most section relative to axis A, of the second section 32. Similarly, when elongate rod 46 is inserted axially further into the shaft 20 such that the marker M2a is axially aligned with the first end 22 of the shaft 20, the applicator 60 will correspondingly be axially aligned with an end, or downstream-most section, of the second section 32. The applicator 60 may be wetted or saturated with the surface treatment agent 42 stored in the surface treatment supply 44, either as needed through the inner passage 52 in the elongate rod 46 or by pre-wetting or saturating the applicator 60 before insertion into the hollow shaft 20. The elongate rod 46 may thus be axially moved in a reciprocating motion between these two positions (i.e., marker M2a being axially aligned with the first end 22 of the shaft 20 and marker M2b being axially aligned with the first end 22 of the shaft 20) to treat the inner surface 28 of the second section 32 of the shaft 20. A similar procedure may be repeated for the first section 30 of the shaft 20, i.e., by axially moving the elongated rod 46 in a reciprocating manner between a first position whereby the marker M1a is axially aligned with the first end 22 of the shaft 20 and a second position whereby the marker M2b is axially aligned with the first end 22 of the shaft 20.

While the above procedure is described for a shaft 20 having multiple sections (with different inner diameters), the present disclosure may also apply to a shaft 20 having a single section, i.e., with a consistent inner diameter throughout. In such a case, the elongated rod 46 may only include one pair of markers M, axially spaced apart from each other at a distance corresponding to the overall axial length L of the shaft 20. Conversely, the elongated rod 46 may have an overall axial length LR taken between the proximal end 48 (or the distal end of the handle 62, if present) and the distal end 50, said overall axial length LR corresponding to the overall axial length L of the shaft 20. As such, a user may simply insert and remove the elongated rod 46 from the hollow shaft completely, in a reciprocating manner, to treat the inner surface 28 of the shaft 20 along its entire axial length L. In an embodiment, various elongated rods 46, each of predetermined lengths LR corresponding to either an overall axial length L of a given shaft 20, or an axial length of a section of a given shaft 20, such that a user may select an appropriately-sized elongated rod 46 to treat the inner surface 28 of a given shaft 20 (or shaft section).

As the stroke length for each shaft section (or each shaft 20) may be represented by the various markers M (or the overall rod length LR), a user may simply treat a given shaft section (or the entire shaft) by applying a predetermined number of strokes, each stroke at the same axial stroke length. The applicator 60 may thus apply a consistent layer of surface treatment agent 42 (e.g., a consistent paint or coating thickness) along the axial length L of the shaft 20, or of each section 30, 32 of the shaft 20. As such, the uniformity of a painting/coating process for a given shaft 20, as well as the repeatability of a painting/coating process for different shaft sections 30, 32 or for multiple shafts 20, may be improved. In particular, as the stroke lengths will be predetermined, repeatability may be improved from one shaft 20 to another, and from one user to another. For instance, a thickness of the surface treatment agent 42, for instance paint, may be consistent along the axial length L of the shaft 20 (i.e., minimal variation of the thickness along the axial length L). In some cases, the desired coating thickness may range from 0.015 to 0025 inches. Other surface treatment agent 42 thicknesses may be contemplated, for instance based on the material of the shaft 20 and the type of liquid coating applied as the surface treatment agent 42.

According to the present disclosure, there is taught an exemplary method for treating an inner surface 28 of a hollow engine shaft 20. An elongated rod 46 is engaged inside the hollow engine shaft 20, the elongated rod 46 having a distal end 50 carrying an applicator 60 wetted with a surface treatment agent 42. The surface treatment agent 42 is spread, with the applicator 60, along the inner surface 28 of a section 30/32 of the hollow engine shaft 20 between a first rod position whereby a first marker M1b/M2b disposed on the elongated rod 46 is axially aligned with a first end 22 of the hollow engine shaft 20 and a second rod position whereby a second marker M1a/M2a disposed on the elongated rod 46 is axially aligned with the first end 22 of the hollow engine shaft, the first marker M1b/M2b and the second marker M1a/M2a being axially spaced apart from one another by an axial length LM1/LM2 corresponding to an axial length L1/L2 of the section 30/32 of the hollow engine shaft 20.

It can be appreciated that at least some embodiments have a surface treatment device with an elongated rod having an applicator disposed at a distal end thereof and markings disposed thereon, the markings axially spaced apart from one another at a distance corresponding to an axial length of a section of a hollow engine shaft with an inner surface to be treated, thereby allowing for improved uniformity and repeatability in applying coating liquids/paint to the inner surfaces of hollow engine shafts.

In the present disclosure, when a specific numerical value is provided (e.g. as a maximum, minimum or range of values), it is to be understood that this value or these ranges of values may be varied, for example due to applicable manufacturing tolerances, material selection, etc. As such, any maximum value, minimum value and/or ranges of values provided herein (such as, for example only, the shaft having an axial length ranging from 20 to 80 inches), include(s) all values falling within the applicable manufacturing tolerances. Accordingly, in certain instances, these values may be varied by ±5%. In other implementations, these values may vary by as much as ±10%. A person of ordinary skill in the art will understand that such variances in the values provided herein may be possible without departing from the intended scope of the present disclosure, and will appreciate for example that the values may be influenced by the particular manufacturing methods and materials used to implement the claimed technology.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A surface treatment device for applying a surface treatment to an inner surface of a hollow engine shaft, the hollow engine shaft extending longitudinally along a shaft axis and having an axial shaft length to be treated, the surface treatment device comprising:
    a supply of a surface treatment agent;
    an elongated rod extending from a proximal end to a distal end, the elongated rod insertable inside the hollow engine shaft;
    an applicator disposed at the distal end of the elongated rod and wetted with the surface treatment agent, the applicator engageable with the inner surface of the hollow engine shaft for applying the surface treatment agent to the inner surface of the hollow engine shaft; and
    a pair of markers provided on an outer surface of the elongated rod and axially spaced apart from one another by a first axial distance corresponding to the axial shaft length, the pair of markers movable with the elongated rod inside the hollow engine shaft to measure a stroke length of the elongated rod relative to the hollow engine shaft.

2. The surface treatment device as defined in claim 1, wherein the first axial distance between the markers of the pair of markers corresponds to a first length of a first section of the hollow engine shaft having a first inner diameter, and wherein the surface treatment device further includes an additional pair of markers fixedly disposed on the elongated rod for joint movement therewith, the markers of the additional pair of markers axially spaced apart from one another by a second axial distance corresponding to a second length of a second section of the hollow engine shaft having a second inner diameter different from the first inner diameter.

3. The surface treatment device as defined in claim 2, wherein a marker from the pair of markers and a marker from the additional pair of markers are disposed axially adjacent one another.

4. The surface treatment device as defined in claim 3, wherein an axial alignment between the marker from the pair of markers and the marker from the additional pair of markers and a first end of the hollow engine shaft through which the elongated rod is insertable corresponds with an axial alignment between the applicator and a transition portion between the first section of the hollow engine shaft and the second section of the hollow engine shaft.

5. The surface treatment device as defined in claim 1, wherein the pair of markers are a pair of visual markers printed or engraved on the elongated rod.

6. The surface treatment device as defined in claim 1, wherein the elongated rod includes an inner passage extending from the proximal end to the distal end, the proximal end having an inlet fluidly coupled to the supply of the surface treatment agent, the inner passage terminating at an outlet at the distal end adjacent the applicator.

7. The surface treatment device as defined in claim 6, wherein the outlet is directly fluidly coupled to the applicator at the distal end for providing the surface treatment agent directly to the applicator.

8. The surface treatment device as defined in claim 1, wherein the supply of the surface treatment agent includes paint for painting the inner surface of the hollow engine shaft.

9. The surface treatment device as defined in claim 1, wherein the applicator is a sponge.

* * * * *